United States Patent
Kosaka et al.

(10) Patent No.: US 6,266,636 B1
(45) Date of Patent: *Jul. 24, 2001

(54) SINGLE DISTRIBUTION AND MIXED DISTRIBUTION MODEL CONVERSION IN SPEECH RECOGNITION METHOD, APPARATUS, AND COMPUTER READABLE MEDIUM

(75) Inventors: Tetsuo Kosaka, Zama; Yasuhiro Komori, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,998

(22) Filed: Mar. 11, 1998

(30) Foreign Application Priority Data

Mar. 13, 1997 (JP) ................................................. 9-059158

(51) Int. Cl.[7] .................................................. G10L 15/20
(52) U.S. Cl. ............................................. 704/244; 704/256
(58) Field of Search ..................................... 704/255, 256, 704/251, 252, 244, 243

(56) References Cited

U.S. PATENT DOCUMENTS

| 5,208,863 | 5/1993 | Sakurai, et al. ......................... 381/43 |
| 5,220,629 | 6/1993 | Kosaka, et al. ......................... 381/52 |
| 5,369,728 | 11/1994 | Kosaka et al. ......................... 395/2.63 |
| 5,621,849 | 4/1997 | Sakurai et al. ......................... 395/2.5 |
| 5,778,340 | * 7/1998 | Hattori ................................. 704/244 |
| 5,787,396 | 7/1998 | Komori et al. ......................... 704/256 |
| 5,797,116 | 8/1998 | Yamada et al. ......................... 704/10 |
| 5,839,105 | * 11/1998 | Ostendorf et al. .................... 704/256 |

FOREIGN PATENT DOCUMENTS

| 0 847 041 | 6/1998 | (EP) . |
| 10-161692 | 6/1998 | (JP) . |

OTHER PUBLICATIONS

Gales et al "Robust continuous speech recognition using parallel model combination" Cambridge University,2–17, Mar. 1994.*

(List continued on next page.)

*Primary Examiner*—William R. Korzuch
*Assistant Examiner*—Donald L. Storm
(74) *Attorney, Agent, or Firm*—Fitzpatrick, Cella, Harper & Scinto

(57) ABSTRACT

A process for removing additive noise due to the influence of ambient circumstances in a real-time manner in order to improve the precision of speech recognition which is performed in a real-time manner includes a converting process for converting a selected speech model distribution into a representative distribution, combining a noise model with the converted to generate speech model a noise superimposed speech model, performing a first likelihood calculation to recognize an input speech by using the noise superimposed speech model, converting the noise superimposed speech model to a noise adapted distribution that retains the relationship of the selected speech model, and performing a second likelihood calculation to recognize the input speech by using the noise adapted distribution.

22 Claims, 5 Drawing Sheets

OTHER PUBLICATIONS

Gales et al "Parallel model combination for speech recognition in noise" Cambridge University,2–13, Jun. 1993.*

"An Improved Approach to the Hidden Markov Model Decomposition . . . ", Gales, et al., Proc. Of ICASSP '92, I–233–236, 1992.

"A Tree–Trellis Based Fast Search for Finding the N Best Sentence . . . ", oong, et al., Proc. Of ICASSP91, pp. 705–708, May 1991.

"The Forward–Backward Search Algorithm," Schwartz, et al.,. Proc. Of ICASSP91, pp. 697–700, May 1991.

R. Schwartz, et al., "A Comparison of Several Approximate Algorithms for Finding Multiple (N–Best) Sentence Hypotheses", ICASSP 91, vol. 1, May 1991, Toronto, Ontario, Canada, S10.4, pp. 701–704.

F.K. Soong, et al., "A Tree–Trellis Based Fast Search for Finding the N Best Sentence Hypotheses in Continuous Speech Recognition", ICASSP 91, vol. 1, May 1991, Toronto, Ontario, Canada, S10.5, pp. 705–708.

M.J.F. Gales, et al., "An Improved Approach to the Hidden Markov Model Decomposition of Speech and Noise", ICASSP–91, vol. 1, Mar. 1992, San Francisco, California, pp. I–233–I–236.

Matsui, T., et al., "N–Best–Based Instantaneous Speaker Adaptation Method for Speech Recognition," Proceedings ICSLP 96, Fourth International Conference on Spoken Language Processing, Philadelphia, PA, Oct. 3–6, 1996, vol. 2, pp. 973–976.

Gales, M.J.F., et al., "An Improved Approach to the Hidden Markov Model Decomposition of Speech and Noise", Speech Processing 1, San Francisco, Mar. 23–26, 1992, pp. 233–236.

* cited by examiner

SINGLE DISTRIBUTION AND MIXED DISTRIBUTION MODEL CONVERSION IN SPEECH RECOGNITION METHOD, APPARATUS, AND COMPUTER READABLE MEDIUM

BACKGROUND OF THE INVENTION

1. Field of the Invention

It is an object of the invention to perform a speech recognition by using a Hidden Markov Model (HMM).

Another object of the invention is to remove additive noise from an input speech.

2. Related Background Art

In the case of performing speech recognition in a real environment, there is a problem of noise as one of large problems. Although the noise is an additive noise which is additively added to spectrum characteristics, there is a Parallel Model Combination (PMC) method as a method which is effective for the additive noise.

The PMC method has been described in detail in M. J. Gales and S. Young, "An Improved Approach to the Hidden Markov Model Decomposition of Speech and Noise", Proc. of ICASSP'92, I-233–236, 1992.

The PMC method is a method of adding and synthesizing an HMM (speech HMM) learned by speech collected and recorded in a noiseless environment and an HMM (noise HMM) learned by noise, thereby approaching a model to a noise superimposed environment and executing a conversion to add a noise to all of the models. In a noise process in the PMC, it is presumed that additiveness of noise and speech is established in a linear spectrum region. On the other hand, in the HMM, parameters of a logarithm spectrum system, such as a cepstrum and the like, are often used as a characteristic amount of the speech. According to the PMC method, those parameters are converted into the linear spectrum region and are added and synthesized in the linear spectrum region of the characteristic amount, which is derived from the speech HMM and noise HMM. After the speech and the noise were synthesized, an inverse conversion is performed to return the synthesized value from the linear spectrum region to the cepstrum region, thereby obtaining a noise superimposed speech HMM.

By using the foregoing PMC method, it is possible to cope with additive noises such as internal noise, background noise, and the like. However, the PMC method has problems such that since a nonlinear conversion is executed to all of the models, the amount of calculations is large, the processing time is very long, and it is not suitable for an instantaneous environment adaptation in which an adaptation to noise is performed simultaneously with recognition.

SUMMARY OF THE INVENTION

According to the invention, adaptation time can be remarkably reduced as compared with the conventional case of performing the noise adaptation by the PMC to all of the models. In particular, even in the case where the number of models increases like phoneme models of an environment depending type, it is possible to cope with such a situation in a short time. Moreover, since an adapting process is executed in a recognizing step, the adaptation and the recognition can be simultaneously performed. Further, by using a high speed PMC method, even in the case where the number of mixed models increases, it is possible to cope with such a situation by a small calculation amount.

DETAILED DESCRIPTION OF THE PREFERRED EMBODIMENTS

An embodiment according to the invention will now be described in detail hereinbelow with reference to the drawings.

Figure 5:
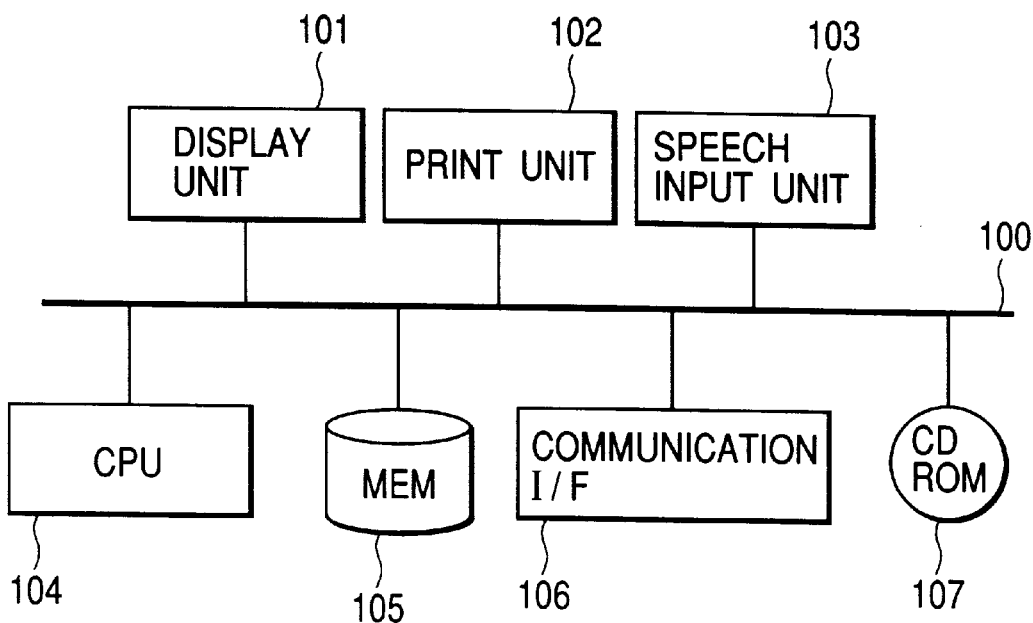
FIG. 5 is a constructional block diagram of the apparatus according to the invention.
Figure 6:
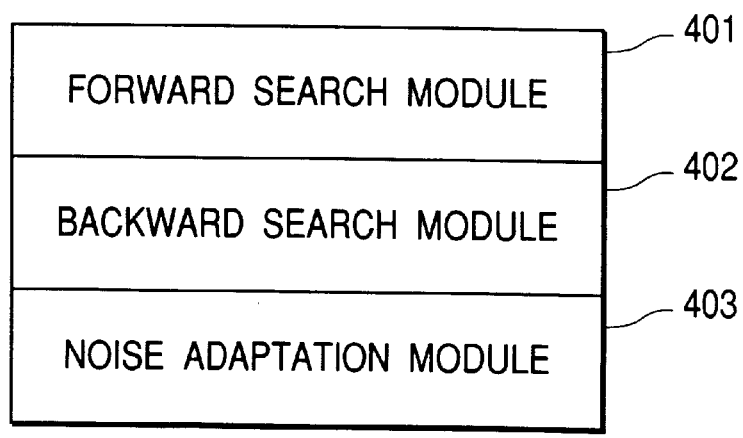
FIG. 6 shows a memory map of a memory medium according to the present invention.

FIG. 5 is a block diagram showing the construction of a speech recognizing apparatus according to the invention. Reference numeral 101 denotes a display unit such as CRT, liquid crystal display, or the like for displaying a character train obtained as a result of a speech recognition; 102 denotes a print unit such an LBP, an ink jet printer, or the like for printing the character train obtained as a result of the speech recognition; and 103 denotes a speech input unit such as a microphone or the like. A speech can be also inputted via a public line or the like or the LAN as a speech input unit 103. Reference numeral 104 denotes a CPU for controlling the apparatus so as to execute various processes, which will be explained hereinlater, in accordance with control programs stored in a memory unit 105 or a detachable storing medium 107 such as a CD-ROM or the like. Although the CPU 104 also controls the execution of various applications in addition to processes, which will be explained hereinlater, the CPU 104 controls the apparatus, (for example, execution of commands such as "print", "end", and the like) so as to execute various processes egarding the applications in accordance with a command corresponding to the speech recognized by the method of the invention. Reference numeral 105 denotes the memory unit provided in the apparatus. The memory unit 105 stores control programs for various processes which are executed by the CPU 104 and will be explained hereinlater, various parameters (for example, data corresponding to a dictionary which is used for the speech recognition, and the like) which are necessary for the control programs, speech data to be recognized, and the like. The control programs and various parameters that are stored in the memory unit 105 can be inputted from the storing medium 107 or can be also inputted and stored through a communication line. Reference numeral 106 denotes a communication I/F for controlling a communication so as to transmit and receive data through communicating means such as public line, LAN, or the like. It is also possible to construct the apparatus in a manner such that speech inputted by another apparatus or control programs and various parameters stored in the other apparatuses are fetched into the apparatus via the communication I/F 106 and are stored in the memory unit 105, and after that, each process which will be explained hereinlater is started. Reference numeral 107 denotes the storing medium such as CD-ROM, FD, or the like which can be attached and detached to/from the apparatus main body, namely, the storing medium which can store the control programs, various parameters, and speech data which have already been described as being stored in the memory unit 105 and can be attached and detached to/from the apparatus main body. The data can be down-loaded from the storing medium 107 to the memory unit 105 before starting various processes, which will be explained hereinlater, or the CPU 104 can also directly access to the storing medium 107. FIG. 6 is a memory map of the data stored in the memory unit 105 or storing medium 107. Control programs for various processes as shown at 401 to 403 have been stored in the memory map. Although not shown in FIG. 6, a parameter storing portion, a speech data storing portion, a working area, and the like besides them are also provided.

Figure 1:
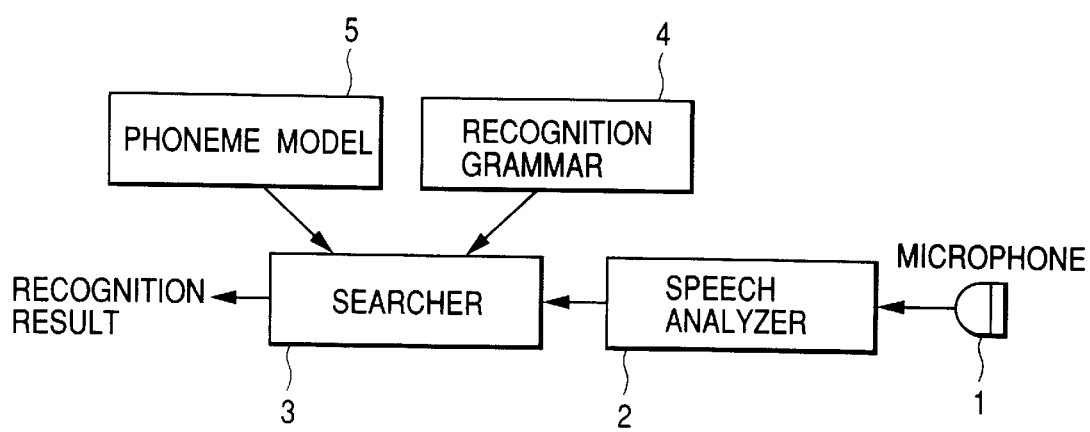
FIG. 1 is a functional block constructional diagram of an apparatus according to the invention.

FIG. 1 is a functional block constructional diagram of an apparatus according to the invention. In the diagram, reference numeral 1 denotes a microphone for inputting a speech. The microphone 1 is realized by the speech input unit 103. Reference numeral 2 denotes a speech analyzer for converting the inputted speech to a feature parameter time series; reference numeral 3 denotes a searcher for searching for a correct recognition series by using information of feature parameters, grammar, and phoneme models. The speech analyzer 2 and searcher 3 are realized by the CPU 104. Reference numeral 4 denotes a recognition grammar and reference numeral 5 indicates a phoneme model for speech recognition. The recognition grammar 4 and phoneme model 5 for speech recognition are realized by the data stored in the memory unit 105 or storing medium 107.

First, 1) a calculating method of a PMC using a backward search by a multipath search will be described with reference to FIG. 1 and a flowchart of FIG. 2.

The multipath searching method is a method of narrowing correct candidates by repeating the search a plurality of times. For example, in a method of outputting a recognition result after completion of the search of two times of a forward search and a backward search, phoneme models, in which the adaptation by the PMC is not performed, are used at the time of the forward search, the PMC is performed to only the phoneme models necessary for recognition at the time of the backward search, and a likelihood calculation is executed by the adapted phoneme models.

The speech inputted by the microphone 1 is converted into a time sequence of a feature amount of the speech such as a cepstrum or the like by a speech analysis in the speech analyzer 2. The multipath search is used in the searching process 3. There is a Tree-trellis based search or a Forward-backward search as a method of recognizing by the multipath search. The Tree-trellis based search has been disclosed in detail in the literature by F. K. Soong and E. F. Huang, "A Tree-Trellis Based Fast Search for Finding the N Best Sentence Hypoteses in Continuous Speech Recognition", Proc. of ICASSP91, pp.705–708, May, 1991. The Forward-backward search has been described in detail in the literature by S. Austin, R. Schwartz, and P. Placeway, "The Forward-Backward Search Algorithm", Proc. of ICASSP91, pp. 697–700, May, 1991. Although an example using the Tree-trellis based search will be described here, the searching method of a searcher is not limited to such an example. The Tree-trellis based search method is an algorithm for realizing a strict N-best search and is constructed by searches of two stages of the forward search and the backward search. In the forward search (the first search), a Viterbi search synchronized with a frame is performed and an upper predetermined number of results among the results obtained by the forward search are selected as recognition candidates by the first search of the input speech. In the backward search (the second search), an A* search, in which the results of the forward search are heuristic, is performed with respect to each of the selected candidates.

In the searches of two stages, a likelihood calculation is executed by using phoneme models before the adaptation by the PMC at the time of the forward search, thereby narrowing the recognition candidates from the grammar (22). The adaptation by the PMC is performed (23) at the time of the backward search (24) with respect to only the phoneme models necessary for recognition of the narrowed recognition candidates, namely, with regard to only the phoneme models constructing the recognition candidates narrowed in (22). The likelihood is calculated by using the phoneme models after the adaptation, thereby obtaining N-best recognition candidates. Since the likelihood at the time of the forward search and the likelihood at the time of the backward search are different, the A* condition is not satisfied. To obtain a more correct result, the recognition candidates are sorted by the likelihoods (25), thereby obtaining a final recognition result (26).

2) A method using an on-demand process will now be described hereinbelow with reference to a flowchart of FIG. 3.

The method using the on-demand process is a method of performing the PMC with respect to only phonemes, which are necessary for recognition in the first searching step and executing a likelihood calculation by the adapted phoneme model.

Figure 2:
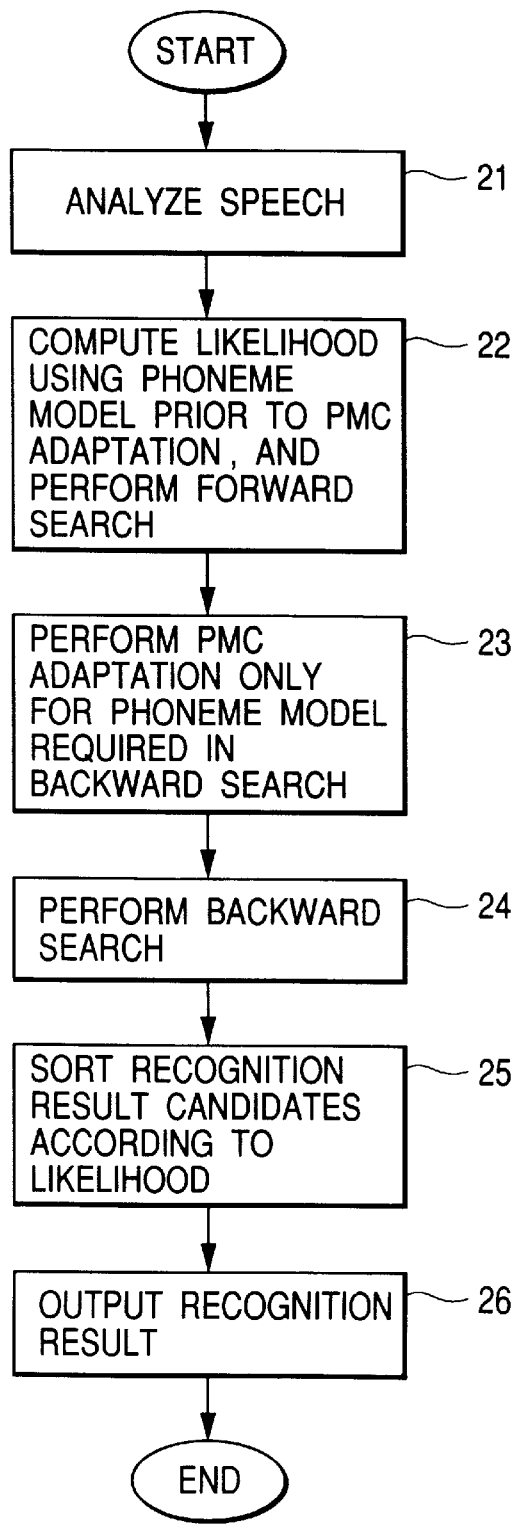
FIG. 2 is a flowchart for a speech recognizing method using a calculating method of a PMC using a backward search by a multipath search.

The processes in the speech input unit 1 and speech analyzer 2 are similar to those in FIG. 2 and the Tree-trellis based search is used for the searching process of the searcher 3 in a manner similar to the case of 1). However, after the adaptation by the PMC was performed (32) with respect to only the phonemes necessary for the likelihood calculation in the forward search (33), the likelihood calculation is executed. The phonemes which are necessary in the forward search are the phonemes which are narrowed as candidates during the search by the search result before then and the recognition grammar 4. The recognition candidates narrowed in the grammar by the process of (33) and the result of the likelihood calculation are stored in the memory unit 105. In the backward search, the result of the likelihood calculation stored in the memory unit 105 is read out and a logarithm likelihood obtained from this value is added, thereby searching (34). A final recognition result is obtained and outputted (35).

In the processes described above, as for the PMC in (23) or (32), the adaptation can be usually performed for every state and every mixed element of each phoneme model. However, a high speed PMC method of synthesizing the mixed elements and converting them into one mix and executing the PMC to such one mix can be also used. The high speed PMC method will now be described hereinbelow. (An example of the high speed PMC methods has been also described in Japanese Patent Application No. 8-336291, "Speech Recognizing Apparatus and Speech Recognizing Method").

1. A mixed distribution of each state of the phoneme models is converted into one distribution (representative distribution).

The conversion is executed by the following equation (1).

where, $(\mu_m, \sigma^2_m)$: distribution in the state $(\mu_c, \sigma^2_c)$: representative distribution w: weight coefficient G: state $$\mu_c = \sum_{m \in G} \omega_m \mu_m \quad (1)$$

$$\sigma_c^2 = \sum_{m \in G} \omega_m \sigma_m^2 + \sum_{m \in G} \omega_m (\mu_m - \mu_c)^2$$

2. A relative positional relation between the representative distribution and each distribution in the states is obtained.

3. A noise adaptation is executed to the representative distribution by the PMC method.

4. Each distribution after the noise conversion is determined by using the relation between the representative distributions before and after the PMC conversion and the representative distributions and the relative positional relation of each distribution obtained in 2.

Figure 3:
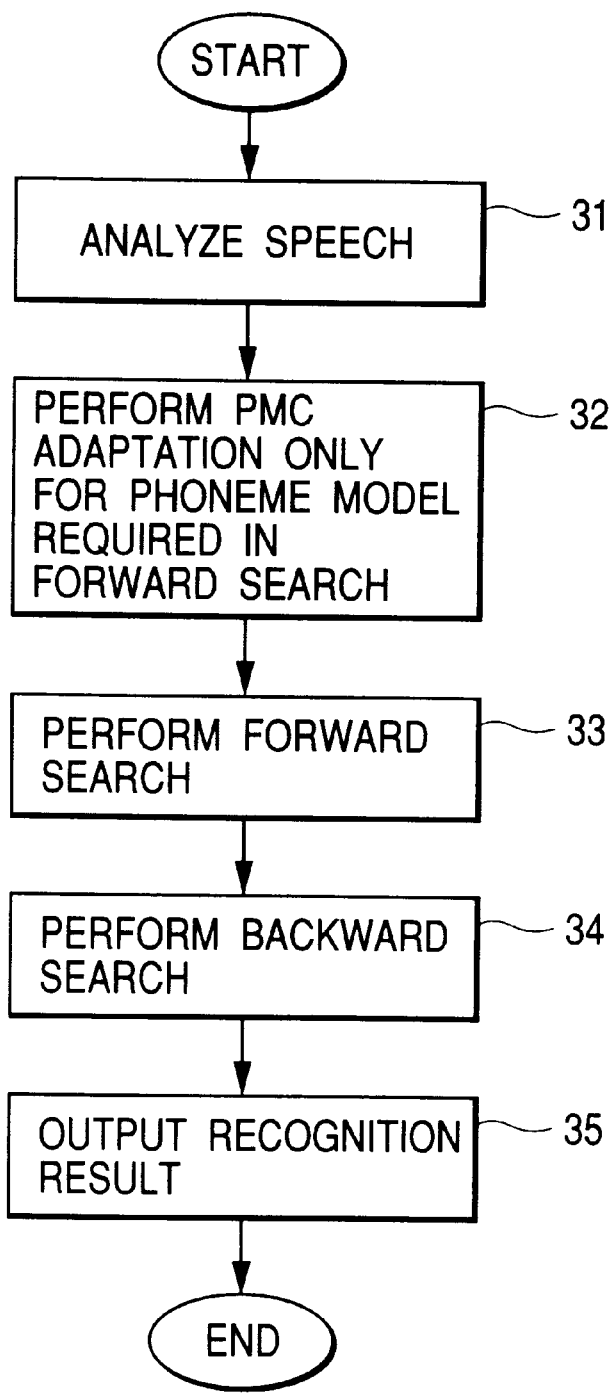
FIG. 3 is a flowchart for a speech recognizing method using a calculating method of a PMC using an on-demand process.

A procedure other than the PMC is executed in a manner similar to the processes described in the flowcharts of FIGS. 2 and 3.

Figure 4:
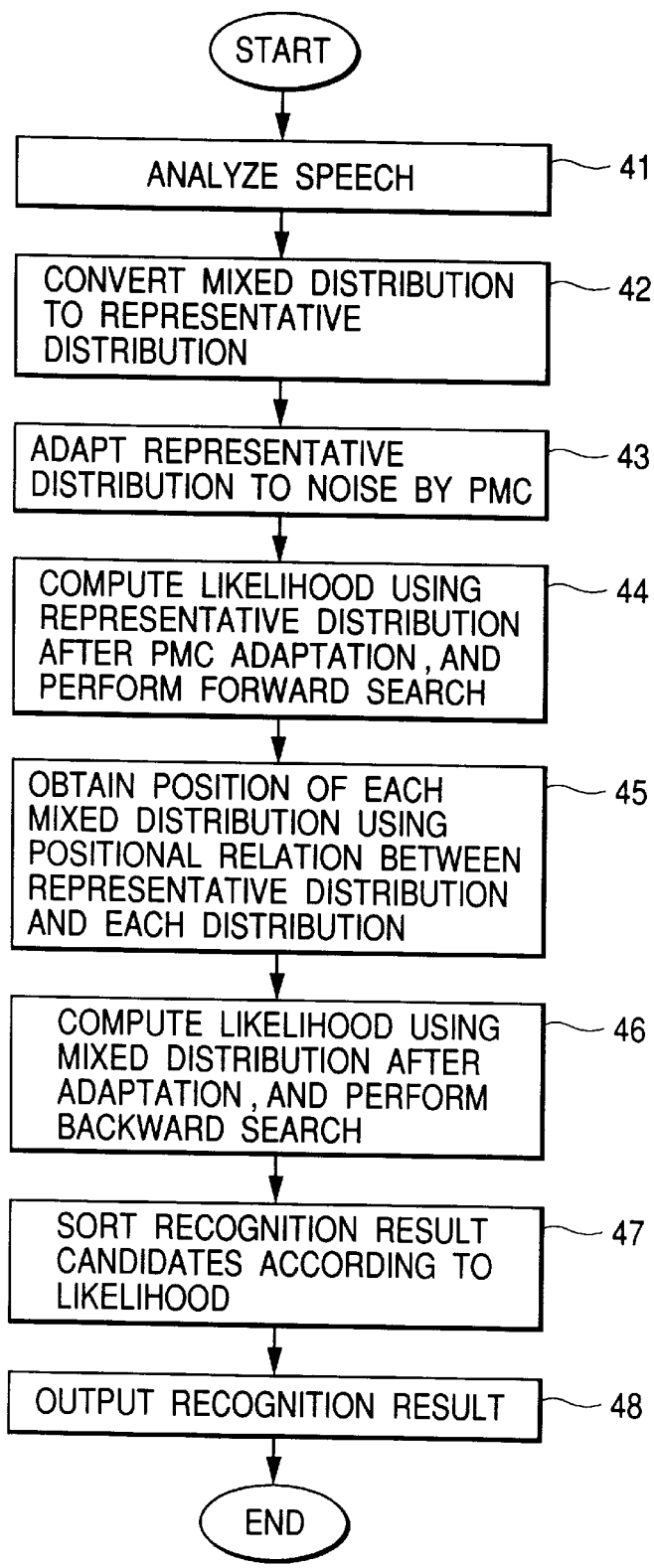
FIG. 4 is a flowchart for a speech recognizing method using a high speed PMC method.

A method of using the above high speed PMC method will now be described with reference to a flowchart of FIG. 4. According to this method, a mixed distribution of each state of the phoneme model necessary for the forward search is first converted into a representative distribution which is expressed by one distribution (42) by using the above equation (1). The phoneme model which is subjected to the conversion to the representative distribution is selected in a manner similar to (32). Subsequently, the representative distribution is adapted to the noise by the PMC method (43). The forward search is subsequently executed. However, different from (22) in FIG. 2 and (33) in FIG. 3, the likelihood calculation in this case is executed by using the representative distribution after it was adapted to the noise by the PMC (44). After completion of the forward search as mentioned above, the position of each mixed distribution after the noise adaptation is obtained (45) by using the relative positional relation between the representative distribution which has already been obtained before the conversion to the representative distribution as mentioned above and each distribution. The likelihood calculation is executed by using the obtained mixed distribution after the adaptation and the backward search is performed (46). In the embodiment, since the likelihood of the forward search and that of the backward search differ, the recognition results are sorted on the basis of the likelihood (47) and the final recognition result is obtained and outputted (48).

What is claimed is:

1. A speech recognition method using hidden Markov models, comprising the steps of:
    converting low noise mixed distribution Markov models into single distribution models;
    combining a noise model with the single distribution models to generate noise superimposed speech models;
    converting at least some of the noise superimposed speech models to noise adapted mixed distribution models that retain the relationship of parameters in low noise mixed distribution Markov models;
    calculating a first set of likelihoods that an input speech utterance corresponds to the noise adapted mixed distribution models;
    selecting at least one noise adapted mixed distribution model at least partially based on the first set of likelihoods; and
    associating the input speech utterance with the low noise mixed distribution Markov models corresponding to the noise adapted mixed distribution models selected based on the first likelihoods.

2. A method according to claim 1, further comprising the steps of:
    holding a likelihood value as a result of said first likelihood calculation at a first time; and
    deciding that a result in which the held likelihood value was added in a searching process at a second time is a likelihood value of a search result at the second time.

3. A method according to claim 1, further comprising the steps of:
    calculating a second set of likelihoods that an input speech utterance corresponds to the noise superimposed speech models; and
    selecting a subset of the noise superimposed speech models based on the second set of likelihoods,
    wherein said noise-adapted-mixed-distribution-models converting step comprises the step of converting the models in said subset to noise adapted mixed distribution models.

4. A method according to claim 3, further comprising the steps of:
    sorting a result of said first likelihood calculation and said second likelihood calculation.

5. A method according to claim 1, further comprising the step of displaying recognition candidate characters on a display.

6. A method according to claim 1, further comprising the step of printing recognition candidate characters by printing means.

7. A method according to claim 1, further comprising the step of recognizing a speech inputted from a microphone.

8. A method according to claim 1, further comprising the step of inputting speech through a communication line.

9. A method according to claim 1, further comprising the step of performing an operation control of an application in accordance with a recognition result.

10. A speech recognition apparatus using hidden Markov models, comprising: first converting means for converting low noise mixed distribution Markov models into single distribution models;
    combining means for combining a noise model with the single distribution models to generate noise superimposed speech models;
    second converting means for converting at least some of the noise superimposed speech models to noise adapted mixed distribution models that retain the relationship of parameters in low noise mixed distribution Markov models;
    calculating means for calculating a first set of likelihoods that an input speech utterance corresponds to the noise adapted mixed distribution models;
    means for selecting at least one noise adapted mixed distribution model at least partially based on the first set of likelihoods calculated by said calculating means; and
    associating means for associating the input speech utterance with the low noise mixed distribution Markov models corresponding to the noise adapted mixed distribution models selected based on the first likelihoods by said selecting means.

11. An apparatus according to claim 10, further comprising:
    holding means for holding a likelihood value as a result of said first likelihood calculation at a first time; and
    likelihood value deciding means for deciding that a result in which the held likelihood value was added in a searching process at a second time is a likelihood value of a search result at the second time.

12. An apparatus according to claim 10, further comprising:

calculating means for calculating a second set of likelihoods that an input speech utterance corresponds to the noise superimposed speech models; and selecting means for selecting a subset of the noise superimposed speech models based on the second set of likelihoods, wherein said noise-adapted-mixed-distribution-models converting means comprises means for converting the models in said subset to noise adapted mixed distribution models.

13. An apparatus according to claim 12, further comprising:

sorting means for sorting a result of said first likelihood calculation and said second likelihood calculation.

14. An apparatus according to claim 10, further comprising display means for displaying recognition candidate characters.

15. An apparatus according to claim 10, further comprising printing means for printing recognition candidate characters.

16. An apparatus according to claim 10, further comprising a microphone for inputting a speech.

17. An apparatus according to claim 10, further comprising a communication line interface for inputting speech.

18. An apparatus according to claim 10, further comprising control means for performing an operation control of an application in accordance with a recognition result.

19. A computer-readable medium encoded with a program using hidden Markov models, said program comprising the steps of:

converting low noise mixed distribution Markov models into single distribution models;

combining a noise model with the single distribution models to generate noise superimposed speech models;

converting at least some of the noise superimposed speech models to noise adapted mixed distribution models that retain the relationship of parameters in low noise mixed distribution Markov models;

calculating a first set of likelihoods that an input speech utterance corresponds to the noise adapted mixed distribution models;

selecting at least one noise adapted mixed distribution model at least partially based on the first set of likelihoods; and associating the input speech utterance with the low noise mixed distribution Markov models corresponding to the noise adapted mixed distribution models selected based on the first likelihoods.

20. A computer-readable medium according to claim 19, further comprising the steps of:

holding a likelihood value as a result of said first likelihood calculation at a first time; and deciding that a result in which the held likelihood value was added in a searching process at a second time is a likelihood value of a search result at the second time.

21. A medium according to claim 19, said program further comprising the steps of:

calculating a second set of likelihoods that an input speech utterance corresponds to the noise superimposed speech models; and selecting a subset of the noise superimposed speech models based on the second set of likelihoods, wherein said noise-adapted-mixed-distribution-models converting step comprises the step of converting the models in said subset to noise adapted mixed distribution models.

22. A computer-readable medium according to claim 21, further comprising the steps of:

sorting a result of said first likelihood calculation and said second likelihood calculation.

* * * * *

UNITED STATES PATENT AND TRADEMARK OFFICE
CERTIFICATE OF CORRECTION

PATENT NO.   : 6,266,636 B1                                        Page 1 of 1
DATED        : July 24, 2001
INVENTOR(S)  : Tetsuo Kosaka et al.

It is certified that error appears in the above-identified patent and that said Letters Patent is hereby corrected as shown below:

Title page,
Item [56], References Cited, OTHER PUBLICATIONS,
"A Tree-Trellis Based Bast Search for Finding The N Best Sentence...", oong, et al., Proc. of ICASSP91, pp. 705-708, May 1991." should be deleted.
"An Improved Approach to the Hidden Marker Model Decomposition...", Gales, et al., Proc. of ICASSP '92, I-233-236, 1992." should be deleted.
"M.J.F. Gales, et al., "An Improved Approach to the Hidden Marker Model Decomposition of Speech and Noise", ICASSP-91, vol. 1, Mar. 1992; San Francisco, California,pp. 1-233-1-236." should be deleted.
Item [57] ABSTRACT, line 7, "converted to generate speech model" should read -- converted speech model to generate --.

Column 1,
Line 56, "increases" should read -- increases, --.

Column 3,
Line 51, "Hypoteses" should read -- Hypotheses --.

Column 6,
Line 39, "first" should read -- ¶ First --.

Signed and Sealed this

Fourth Day of June, 2002

Attest:

*Attesting Officer*

JAMES E. ROGAN
*Director of the United States Patent and Trademark Office*